3,417,106
4-OXA-19-NOR-$\Delta^{1,5(10)}$-PREGNADIENE-3,20-DIONE STEROIDS AND THEIR PREPARATION Alexander D. Cross, Mexico City, Mexico, assignor to Syntex Corporation, Panama, Panama, a corporation of Panama
No Drawing. Filed Nov. 16, 1964, Ser. No. 411,554
10 Claims. (Cl. 260—340.5)

ABSTRACT OF THE DISCLOSURE

Novel 4 - oxa - 19 - norpregna-1,5(10)-diene-3,20-dione steroids which are, inter alia, progestational and corticoidal agents and processes for the preparation of such compounds.

---

The present invention relates to novel cyclopentanophenanthrene derivatives and to a process for the production thereof.

More particularly the present invention relates to novel 4-oxa-19-nor-$\Delta^{1,5(10)}$-pregnadiene-3,20-dione derivatives.

The novel compounds of the present invention are represented by the following formulae:

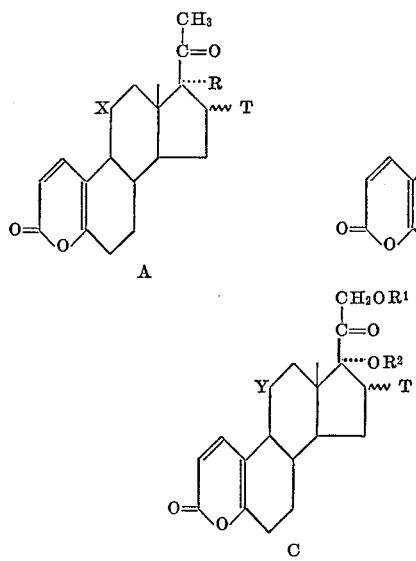

In the above formulae R represents hydrogen, hydroxyl or a hydrocarbon carboxylic acyloxy group of less than 12 carbon atoms; $R^1$ represents hydrogen or a hydrocarbon carboxylic acyl group of less than 12 carbon atoms; $R^2$ represents hydrogen; T may be hydrogen or methyl, the latter preferably at the $\alpha$-position in Formula C; R and T, together, and —$OR^2$ and T, together, represent a 16$\alpha$,17$\alpha$-lower alkylenedioxy grouping; X represents hydrogen, $\beta$-hydroxyl or keto; Y represents $\beta$-hydroxyl or keto; where R is hydrogen, X is preferably hydrogen.

The acyl and acyloxy groups are derived from hydrocarbon carboxylic acids containing less than 12 carbon atoms which may be saturated or unsaturated, of straight, branched, cyclic or cyclic-aliphatic chain, or aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and $\beta$-chloropropionate.

The compounds represented by the above Formulae A and B are progestational agents with good oral activity. In addition they have antiandrogenic, antigonadotrophic and antiestrogenic properties and are useful in fertility control. Furthermore, they may be used in the treatment of premenstrual tension and exhibit blood cholesterol lowering and diuretic activities.

The compounds represented by the above Formula C are valuable cortical hormones with high antiinflammatory, low catabolic, glycogenic and thymolytic activities. In addition, they are antiandrogenic, antigonadotrophic and antiestrogenic hormones. Furthermore, they have topical activity in skin disorders such as psoriasis, allergic dermatitis and the like.

The novel compounds of the present invention are prepared by the process illustrated by the following scheme:

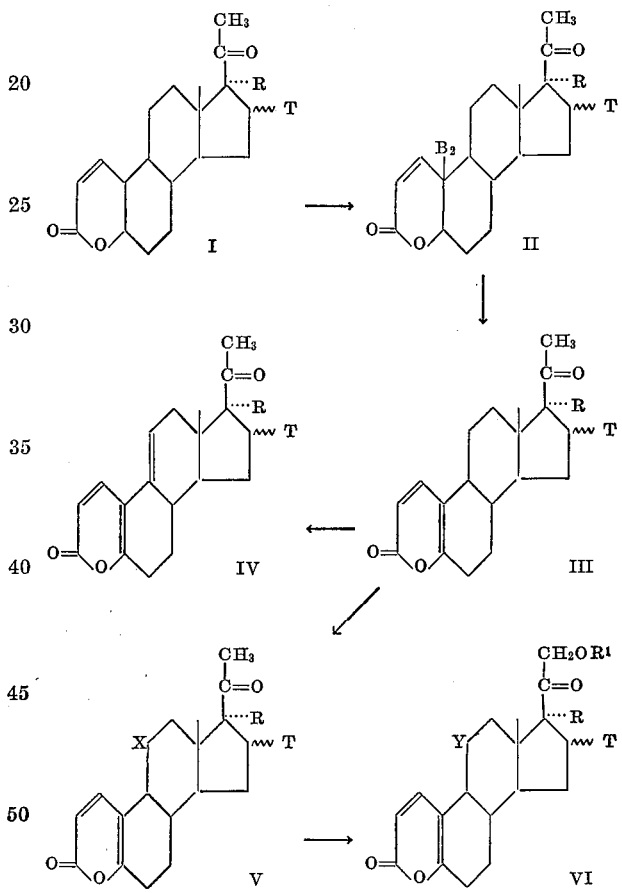

In the above formulae R, $R^1$, $R^2$, T, X and Y have the same meaning as set forth hereinabove.

In accordance with the above equation, the starting compound which is 4-oxa-19-nor-$\Delta^1$-5$\alpha$-pregnene-3,20-dione, or a derivative thereof (I) is treated with approximately 1 molar equivalent of an N-bromoimide, such as bromosuccinimide, in an inert solvent, for example carbon tetrachloride, preferably at reflux temperature during approximately 1.5 hours, thus giving the corresponding 10$\beta$-bromo derivatives (II), which upon mild alkaline treatment, for example in a mixture of calcium carbonate-dimethylformamide during approximately 30 minutes, at reflux temperature, produces the corresponding 4-oxa-19-nor-$\Delta^{1,5(10)}$-pregnadien-3,20-dione derivative (III). The latter compound is treated with a quinone of a reduction potential of less than —0.5 v. such as chloranil or 2,3-dichloro-5,6-dicyano-1,4-benzoquinone, in an inert solvent such as dioxane, preferably at reflux temperature during the period of time of the order of 10 hours, thus giving the corresponding 4-oxa-19-nor-$\Delta^{1,5(10),9(11)}$-pregnatriene-3,20-dione derivative (IV).

Alternatively, a 4-oxa-19-nor-$\Delta^{1,5(10)}$-pregnadiene-3,20-dione derivative (III), preferably one having an oxygen atom attached at C–17 is conventionally treated with cattle adrenal glands, to give the corresponding 11β-hydroxy compound (V; X=β—OH) which is oxidized, e.g., with Jones' reagent to the corresponding 11-keto derivative (V; X=O). Any of the latter 11-substituted compounds (V; X≠H) upon treatment with iodine in the presence of calcium oxide, followed by reflux with potassium acetate in acetone afford the corresponding 21-acetates (VI; R¹=acetyl). The acetyl group of the latter compounds may be hydrolyzed in a mild basic medium to give the corresponding 21-free alcohols (VI; R¹=H) which, in turn, may be acylated in pyridine with a suitable acylating agent such as an anhydride or a chloride of a hydrocarbon carboxylic acid of the type described hereinbefore, to give the corresponding 21-acylates, wherein the acyl group may be different from the previously hydrolyzed one.

The compounds of the present invention having in the molecule a tertiary hydroxyl group, e.g., at C–17, are conventionally esterified in the presence of p-toluenesulfonic acid with an acylating agent, such as acetic anhydride, caproic anhydride, cyclopentylpropionic anhydride, or enanthic anhydride, to produce the corresponding esters.

The following specific examples serve to illustrate but are not intended to limit the scope of the present invention.

PREPARATION 1

250 cc. of a 25% aqueous sodium hydroxide solution was added to a solution of 5 g. of 19-hydroxyprogesterone in 600 cc. of methanol and the mixture was kept for 8 hours at 70° C. Water was then added, the resulting mixture was extracted with methylene chloride, the extract was washed with water, dried over anhydrous sodium sulfate and evaporated to dryness. Crystallization of the residue from acetone-hexane yielded 19-nor-progesterone.

A solution of 4.5 g. of 19-nor-progesterone in 50 cc. of glacial acetic acid and 50 cc. of ethyl acetate was placed in an ozonization tube, cooled in an ice-salt bath. A stream of ozone was introduced for 2 hours (0.024 mol per hour), then 20 cc. of water and 3 cc. of 30% hydrogen peroxide were added and the whole was stirred vigorously. The mixture was stirred at room temperature for 16 hours. Then more ethyl acetate was added, the mixture washed successively with water, 5% aqueous sodium iodide solution, aqueous sodium thiosulfate, and water, then dried over anhydrous sodium sulfate and evaporated to dryness. Recrystallization of the residue from acetone-hexane yielded 4,19-bis-nor-3,5-seco pregnane-5, 20-dione-3-oic acid.

A solution of 4 g. of sodium borohydride in 150 cc. of water was added to an ice-cooled solution of 4 g. of the latter compound in 320 cc. of dioxan and the mixture was allowed to stand for 30 minutes at 0° C. Then 250 cc. of water were added; the excess reagent was decomposed by addition of 1:1 hydrochloric acid. Excess of hydrochloric acid precipitated the desired lactone which was filtered off and dried. The solid was mixed with 40 cc. of dioxane and 2 g. of 2,3-dichloro-5,6-dicyano-1,4-benzoquinone and the resulting mixture refluxed for 50 hours. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave 4-oxa-19-nor-$\Delta^1$-5α-pregnen-20-ol-3-one.

A solution of 3 g. of the latter compound in 120 cc. of pyridine was added to a mixture of 3 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 4-oxa-19-nor-$\Delta^1$-5α-pregnene-3,20-dione.

The starting compounds listed hereinafter under I (obtained according to A. Bowers, U.S. patent application Ser. No. 201,802 filed June 12, 1962, now U.S. Patent No. 3,145,202, by subjecting the corresponding 3,19-dihydroxy-$\Delta^5$ compounds to Oppenauer conditions during 5 to 15 minutes) were treated in accordance with the above procedures, thus yielding the final products set forth under II.

| I | II |
|---|---|
| 16α-methyl-$\Delta^4$-pregnen-19-ol-3,20-dione. | 16α-methyl-4-oxa-19-nor-$\Delta^1$-5α-pregnene-3,20-dione. |
| 16β-methyl-$\Delta^4$-pregnen-19-ol-3,20-dione. | 16β-methyl-4-oxa-19-nor-$\Delta^1$-5α-pregnene-3,20-dione. |
| 16α,17α-isopropylidene-dioxy-$\Delta^4$-pregnen-19-ol-3,20-dione. | 16α,17α-isopropylidenedioxy 4-oxa-19-nor-$\Delta^1$-5α-pregnene 3,20-dione. |
| 17-acetate of $\Delta^4$-pregnene-17α,19-diol-3,20-dione. | 4-oxa-19-nor-$\Delta^1$-5α-pregnen-17α-ol-3,20-dione. |
| 17-acetate of 16α-methyl-$\Delta^4$-pregnene-17α,19-diol-3,20-dione. | 16α-methyl-4-oxa-19-nor-$\Delta^1$-5α-pregnen-17α-ol-3,20-dione. |

EXAMPLE I 5 g. of 4-oxa-19-nor-$\Delta^1$-5α-pregnene-3,20-dione in 200 cc. of carbon tetrachloride were refluxed with 1.1 molar equivalents of N-bromosuccinimide during 1 and a half hours. The mixture was filtered to eliminate the succinimide that was formed during the reaction. The filtrate was evaporated to dryness under reduced pressure. Recrystallization from methylene-chloride-hexane gave 10β-bromo-4-oxa-19-nor-$\Delta^1$-5α-pregnene-3,20-dione (Compound No. 1).

1 g. of the above compound was refluxed with 1 g. of calcium carbonate and 50 cc. of dimethyl formamide for 30 minutes. The mixture was filtered, the solvent evaporated under reduced pressure and the residue crystallized from acetone-hexane to afford 4-oxa-19-nor-$\Delta^{1,5(10)}$-pregnadiene-3,20-dione (Compound No. 2).

The compounds listed under I were treated by the foregoing procedure, giving firstly the corresponding 10β-bromo compounds and finally the products set forth under II:

| Cpd. No. | I | II |
|---|---|---|
| 3 | 16α-methyl-4-oxa-19-nor-$\Delta^1$-5α-pregnene-3,20-dione. | 16α-methyl-4-oxa-19-nor-$\Delta^{1,5(10)}$-pregnadiene-3,20-dione. |
| 4 | 16β-methyl-4-oxa-19-nor-$\Delta^1$-5α-pregnene-3,20-dione. | 16β-methyl-4-oxa-19-nor-$\Delta^{1,5(10)}$-pregnadiene-3,20-dione. |
| 5 | 16α,17α-isopropylidene-dioxy-4-oxa-19-nor-$\Delta^1$-5α-pregnene-3,20-dione. | 16α-17α-isopropylidenedioxy-4-oxa-19-nor-$\Delta^{1,5(10)}$-pregnadiene-3,20-dione. |
| 6 | 4-oxa-19-nor-$\Delta^1$-5α-pregnen-17α-ol-3,20-dione. | 4-oxa-19-nor-$\Delta^{1,5(10)}$-pregnadien-17α-ol-3,20-dione. |
| 7 | 16α-methyl-4-oxa-19-nor-$\Delta^1$-5α-pregnen-17α-ol-3,20-dione. | 16α-methyl-4-oxa-19-nor-$\Delta^{1,5(10)}$-pregnadien-17α-ol-3,20-dione. |

EXAMPLE II

A mixture of 500 mg. of Compound No. 2, 10 cc. of dioxane and 350 mg. of 2,3-dichloro-5,6-dicyano-1,4-benzoquinone was refluxed during 10 hours. Then it was cooled, the 2,3-dichloro-5,6-dicyano-1,4-benzohydroquinone formed during the reaction was filtered off and the filtrate evaporated to dryness. The residue was dissolved in acetone and filtered through 10 g. of alumina. Crystallization from acetone-hexane gave 4-oxa-19-nor-$\Delta^{1,5(10),9(11)}$-pregnatriene-3,20-dione (Compound No. 8).

The compounds Nos. 3 to 7, inclusive, were treated by the above procedure thus affording respectively:

Compound No.

9.—16α-methyl-4-oxa-19-nor-$\Delta^{1,5(10),9(11)}$-pregnatriene-3,20-dione.

10.—16β-methyl-4-oxa-19-nor-$\Delta^{1,5(10),9(11)}$-pregnatriene-3,20-dione.

11.—16α,17α - isopropylidenedioxy - 4 - oxa - 19 - nor-Δ$^{1,5(10),9(11)}$-pregnatriene-3,20-dione.

12.—4-oxa - 19 - nor-Δ$^{1,5(10),9(11)}$-pregnatrien-17α-ol-3,20-dione.

13.—16α - methyl - 4 - oxa - 19 - nor-Δ$^{1,5(10),9(11)}$-pregnatrien 17α-ol-3,20-dione.

EXAMPLE III

To a solution of 5 g. of Compound No. 6 in 100 cc. of anhydrous benzene there were added 1 g. of p-toluenesulfonic acid and 10 cc. of caprioc anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the caproate of 4-oxa-19-nor-Δ$^{1,5(10)}$-pregnadien-17α-ol-3,20-dione (Compound No. 14).

The Compounds Nos. 7, 12 and 13 were treated by the same procedure, to give the corresponding caproates.

EXAMPLE IV

The starting compounds of Example III were treated following exactly the procedure described in that example, except that caproic anhydride was substituted by acetic anhydride, propionic anhydride, enanthic anhydride and cyclopentylpropionic anhydride thus affording respectively the corresponding acetates, propionates, enanthates, and cyclopentylpropionates of said starting compounds.

EXAMPLE V

The following solutions A, B and C were prepared using distilled water as solvent: solution A was prepared by mixing 425 cc. of a 1.742% dipotassic phosphate solution ($K_2HPO_4$) with 75 cc. of 1.38% monosodic phosphate; solution B was prepared by diluting a mixture of 1 l. of 4.5% sodium chloride solution, 40 cc. of a 5.75% potassium chloride solution and 10 cc. of a 19.1% magnesium sulfate, to a volume of 5 l.; solution C was prepared by dissolving 20.9 g. of fumaric acid and 14.4 g. of sodium hydroxide in 1 l. of water and diluting the solution to 1.2 l. Then 475 cc. of solution A, 4.32 l. of solution B and 1.2 l. of solution C were mixed.

Adrenal glands of recently slaughtered cattle, defatted, were ground in a meat grinder until a homogeneous mass was obtained; to 1 kg. of homogenate was added 2 liters of the mixture of A, B, and C solutions with vigorous stirring. To the mixture there was then added 1 g. of Compound No. 5 dissolved in 5.35 parts of propylenglycol, the mixture was stirred at 28–37° C. for 3 hours, 13 liters of acetone were added and the mass was stirred at room temperature for an additional 1 hour.

The acetone extract was separated by filtration, the ground adrenals were washed with 6 liters of acetone, the extracts were combined and the solvent removed by distillation under reduced pressure. Chromatography on alumina and crystallization of the solid fractions afforded 16α,17α - isopropylidenedioxy - 4 - oxa - 19 - nor-Δ$^{1,5,(10)}$-pregnadien-11β-ol-3,20-dione (Compound No. 15).

The Compounds Nos. 6 and 7 were treated by the same procedure thus affording respectively: 4-oxa-19-nor-Δ$^{1,5(10)}$-pregnadiene-11β,17α-diol-3,20-dione (Compound No. 16) and 16α-methyl-4-oxa-19-nor-Δ$^{1,5(10)}$-prenadiene-11β,17α-diol-3,20-dione (Compound No. 17).

EXAMPLE VI

A solution of 1 g. of Compound No. 15 in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5 C. and diluted with water. The precipitate was collected, washed with water and dried under vacuum, thus affording a crude product which upon recrystallization from acetone-hexane gave 16α,17α-isopropylidenedioxy - 4 - oxa - 19 - nor-Δ$^{1,5(10)}$-pregnadiene-3,11,20-trione (Compound No. 18).

Upon treatment of Compounds Nos. 16 and 17 there were respectively obtained: 4-oxa-19-nor-Δ$^{1,5(10)}$-pregnadien-17α-ol-3,11,20-trione (Compound No. 19) and 16α-methyl - 4-oxa - 19-nor-Δ$^{1,5(10)}$-pregnadien-17α-ol-3,11,20-trione (Compound No. 20).

EXAMPLE VII

A cooled solution of 4 g. of Compound No. 15 in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving the corresponding 21-iodo derivative. This compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol-water, thus yielding 16α,17α-isopropylidenedioxy-4-oxa-19-nor-Δ$^{1,5(10)}$ - pregnadiene-11β,21-diol-3,20-dione 21-acetate (Compound No. 21).

The Compounds Nos. 16 to 20, inclusive, were treated by the latter procedure, thus yielding respectively:

Compound No.

22.—4-oxa-19-nor-Δ$^{1,5(10)}$-pregnadiene-11β,17α,21-triol-3,20-dione 21-acetate.

23.—16α-methyl-4-oxa-19-nor-Δ$^{1,5(10)}$-pregnadiene-11β,17α,21-triol-3,20-dione 21-acetate.

24.—16α,17α-isopropylidenedioxy-4-oxa-19-nor-Δ$^{1,5(10)}$-pregnadien-21-ol-3,11,20-trione 21-acetate.

25.—4-oxa-19-nor-Δ$^{1,5(10)}$-pregnadiene-17α,21-diol-3,11,20-trione 21-acetate.

26.—16α-methyl-4-oxa-19-nor-Δ$^{1,5(10)}$-pregnadiene-17α,21-diol-3,11,20-trione 21-acetate.

EXAMPLE VIII 2 g. of Compound No. 21 were dissolved in 50 cc. of methanol and treated with 5 cc. of a 4% aqueous solution of potassium hydroxide; the reaction mixture was stirred for 1 hour under an atmosphere of nitrogen at 0° C.; the mixture was acidified with acetic acid and the methanol distilled under reduced pressure. The residue was triturated with water and the solid collected, washed with water, dried and recrystallized from ethyl acetate-methanol, thus producing 16α,17α-isopropylidenedioxy-4 - oxa - 19 - nor-Δ$^{1,5(10)}$-pregnadiene-11β,21-diol - 3,20 - dione (Compound No. 27).

The Compounds Nos. 22 to 26, inclusive, were treated by the above procedure, thus yielding respectively:

Compound No.

28.—4-oxa-19-nor-Δ$^{1,5(10)}$-pregnadiene-11β,17α,21 - triol-3,20-dione.

29.—16α-methyl-4-oxa-19-nor-Δ$^{1,5(10)}$ - pregnadiene - 11β,17α,21-triol-3,20-dione.

30.—16α,17α-isopropylidenedioxy-4-oxa-19-nor - Δ$^{1,5(10)}$-pregnadien-21-ol-3,11,20-trione.

31.—4-oxa-19-nor-Δ$^{1,5(10)}$-pregnadiene-17α,21-diol - 3,11,20-trione.

32.—16α-methyl-4-oxa-19-nor-Δ$^{1,5(10)}$ - pregnadiene - 17α,21-diol-3,11,20-trione.

EXAMPLE IX

A mixture of 1 g. of Compound No. 27, 4 cc. of pyridine and 2 cc. of propionic anhydride was kept at room temperature overnight, poured into ice water, the formed precipitate was filtered, washed with water and dried. Crystallization from acetone-hexane gave 16α,17α-isopropylidenedioxy-4-oxa-19-nor-Δ$^{1,5(10)}$-pregnadiene-.11β,21-diol-3,20-dione 21-propionate (Compound No. 33).

The Compounds Nos. 28 to 32 inclusive, were treated by the above procedure, thus yielding respectively:

Compound No.
34.—4-oxa-19-nor-Δ$^{1,5(10)}$-pregnadiene-11β,17α,21-triol-3,20-dione 21-propionate.
35.—16α-methyl-4-oxa-19-nor-Δ$^{1,5(10)}$-pregnadiene-11β,17α,21-triol-3,20-dione 21-propionate.
36.—16α,17α-isopropylidenedioxy-4-oxa-19-nor-Δ$^{1,5(10)}$-pregnadien-21-ol-3,11,20-trione 21-propionate.
37.—4-oxa-19-nor-Δ$^{1,5(10)}$-pregnadiene-17α,21-diol-3,11,20-trione 21-propionate.
38.—16α-methyl-4-oxa-19-nor-Δ$^{1,5(10)}$-pregnadiene-17α,21-diol-3,11,20-trione 21-propionate.

EXAMPLE X

The starting compounds of Example IX were treated following exactly the procedure described in that example, except that propionic anhydride was substituted by caproic anhydride, enanthic anhydride, and cyclopentylpropionic anhydride thus affording respectively the corresponding caproates, enanthates and cyclopentylpropionates of said starting compounds.

I claim:
1. A compound of the following formula:

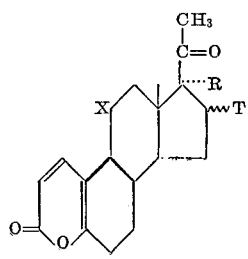

wherein R is selected from the group consisting of hydrogen, hydroxyl and hydrocarbon carboxylic acyloxy of less than 12 carbon atoms; T is selected from the group consisting of hydrogen and methyl; R and T, together, form a 16α,17α-lower alkylidenedioxy grouping; and X is selected from the group consisting of hydrogen, β-hydrogen and keto.

2. 4-oxa-19-nor-Δ$^{1,5(10)}$-pregnadiene-3,10-dione.
3. 16α-methyl-4-oxa-19-nor-Δ$^{1,5(10)}$-pregnadiene-3,20-dione.
4. 16β-methyl-4-oxa-19-nor-Δ$^{1,5(10)}$-pregnadiene-3,20-dione.
5. 16α,17α-isopropylidenedioxy-4-oxa-19-nor-Δ$^{1,5(10)}$-pregnadiene-3,20-dione.
6. 4-oxa-19-nor-Δ$^{1,5(10)}$-pregnadien-17α-ol-3,20-dione.
7. 16α-methyl-4-oxa-19-nor-Δ$^{1,5(10)}$-pregnadien-17α-ol-3,20-dione.
8. 16α,17α-isopropylidenedioxy-4-oxa-19-nor-Δ$^{1,5(10)}$-pregnadiene-11β-ol-3,20-dione.
9. 4-oxa-19-nor-Δ$^{1,5(10)}$-pregnadiene-11β,17α-diol-3,20-dione.
10. 16α-methyl-4-oxa-19-nor-Δ$^{1,5(10)}$-pregnadiene-11β,17α-diol-3,20-dione.

References Cited

UNITED STATES PATENTS 3,296,278   1/1967   Cross _____ 260—343.2

NICHOLAS S. RIZZO, *Primary Examiner.*

J. H. TURNIPSEED, *Assistant Examiner.*

U.S. Cl. X.R.

167—65; 260—343.2; 195—51

UNITED STATES PATENT OFFICE
CERTIFICATE OF CORRECTION

Patent No. 3,417,106                                                December 17, 1968

Alexander D. Cross

It is certified that error appears in the above identified patent and that said Letters Patent are hereby corrected as shown below:

Column 1, Formula B should appear as shown below:

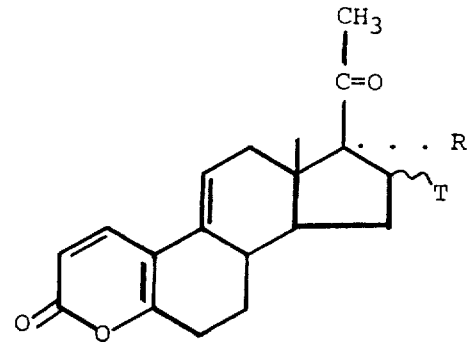

B

Column 2, Formula II should appear as shown below:

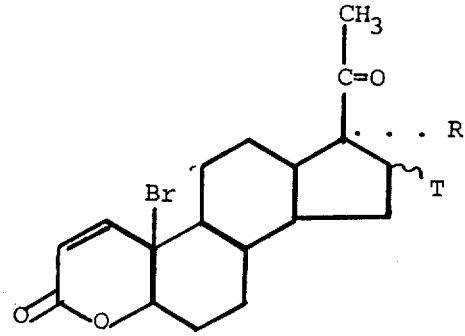

II same column 2, Formula VI should appear as shown below:

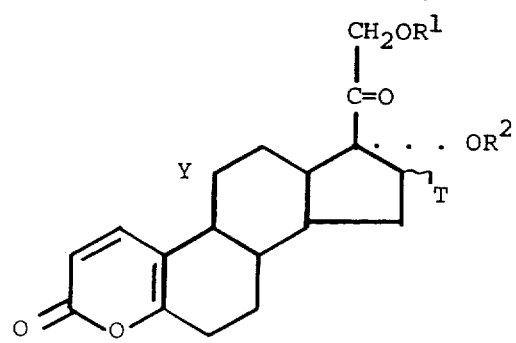

VI 3,417,106

(2)

Column 8, lines 6 and 7, "β-hydrogen" should read -- β-hydroxyl --; line 8, "3,10-dione" should read -- 3,20-dione --.

Signed and sealed this 7th day of April 1970.

(SEAL)
Attest:

EDWARD M. FLETCHER, JR.
Attesting Officer

WILLIAM E. SCHUYLER, JR.
Commissioner of Patents